United States Patent [19]

Gordon et al.

[11] Patent Number: 4,700,339

[45] Date of Patent: Oct. 13, 1987

[54] WAVELENGTH DIVISION MULTIPLEXED SOLITON OPTICAL FIBER TELECOMMUNICATION SYSTEM

[75] Inventors: James P. Gordon, Rumson; Mohammed N. Islam, Red Bank; Linn F. Mollenauer, Colts Neck, all of N.J.

[73] Assignee: American Telephone and Telegraph Company, AT&T Bell Laboratories, Murray Hill, N.J.

[21] Appl. No.: 823,388

[22] Filed: Jan. 28, 1986

[51] Int. Cl.$^4$ ................................ H04B 9/00
[52] U.S. Cl. ..................... 370/3; 455/608; 455/611; 455/612; 370/1
[58] Field of Search ............... 370/3, 1; 455/611, 612, 455/608

[56] References Cited

U.S. PATENT DOCUMENTS

| | | | |
|---|---|---|---|
| 4,406,003 | 9/1983 | Eberly et al. | 370/3 |
| 4,406,516 | 9/1983 | Hasegawa | 350/96.29 |
| 4,435,040 | 3/1983 | Cohen et al. | 350/96.3 |
| 4,558,921 | 12/1985 | Hasegawa et al. | 350/96.29 |

OTHER PUBLICATIONS

*Applied Physics Letters*, vol. 23, No. 3, Aug. 1, 1973, "Transmission of Stationary Nonlinear Optical Pulses in Dispersive Dielectric Fibers, I, Anomalous Dispersion" by A. Hasegawa et al., pp. 142-144.
*Physical Review Letters*, vol. 45, No. 13, Sep. 29, 1980, "Experimental Observation of Picosecond Pulse Narrowing and Solitons in Optical Fibers", by L. F. Mollenauer et al., pp. 1095-1098.
*Proceedings of the IEEE*, vol. 69, No. 9, Sep. 1981, "Signal Transmission by Optical Solitons in Monomode Fiber" by A. Hasegawa et al., pp. 1145-1150.
*Applied Optics*, vol. 23, No. 19, Oct. 1, 1984, "Numerical Study of Optical Soliton Transmission Amplified Periodically by the Stimulated Raman Process" by A. Hasegawa, pp. 3302-3309.
*Optics Letters*, vol. 10, May 1985, "Experimental Demonstration of Soliton Propagation in Long Fibers: Loss Compensated by Raman Gain" by L. F. Mollenauer et al., pp. 229-231.
*Electronics Letters*, vol. 21, No. 24, Nov. 21, 1985, "Mutual Interaction Between Solitons of Unequal Amplitudes in Optical Fibre" by P. L. Chu et al., pp. 1133-1134.
*Electronics Letters*, vol. 18, No. 24, Nov. 25, 1982, "Low-Loss Quadruple-Clad Single-Mode Lightguides with Dispersion below 2 ps/km nm Over the 1.28 $\mu$m-1.65 $\mu$m Wavelength Range" by L. G. Cohen et al., vol. 18, 1982, pp. 1023-1024.

*Primary Examiner*—Robert L. Griffin
*Assistant Examiner*—Leslie Van Beek
*Attorney, Agent, or Firm*—Eugen E. Pacher

[57] ABSTRACT

The propagation speed of optical solitons in single mode optical fiber depends on the wavelength of the solitons. Thus, if solitons of different wavelengths are co-propagating, "collisions" between pulses can be expected to result. It has been found that collisions between solitons do preserve the soliton character of the colliding pulses, even in the presence of perturbations of the type present in fiber communications systems, e.g., core size variations, distributed or lumped loss, and distributed gain. Thus, a wavelength division multiplexed soliton system is possible, and techniques and formulae for the design of such systems are disclosed. In preferred embodiments, fiber loss is periodically compensated by Raman gain. Typical amplification periods (using currently available silica-based fiber) are 30-50 km, typical pump powers are less than 100 mV, and rate-length products of the order of $3 \cdot 10^5$ GHz km are possible. Multiplexed soliton systems have several advantages over prior art soliton systems. For instance, they permit attainment of very high transmission rates without the use of very high speed electronics. For instance, an exemplary 3000 km, 24 channel multiplexed soliton system has a total transmission rate of 106 GHz, i.e., 4.5 GHz/channel.

4 Claims, 4 Drawing Figures

WAVELENGTH DIVISION MULTIPLEXED SOLITON OPTICAL FIBER TELECOMMUNICATION SYSTEM

FIELD OF THE INVENTION

This invention pertains to optical fiber communications systems.

BACKGROUND OF THE INVENTION

It has been known for some time that under certain conditions shape-maintaining pulses of electromagnetic radiation can exist in single mode optical fiber. Such pulses are termed solitons (A. Hasegawa et al, *Applied Physics Letters*, Volume 23(3), pages 142-144, 1973). The existence of solitons has been experimentally demonstrated (L. F. Mollenauer et al, *Physical Review Letters*, Volume 45(13), pages 1095-1098, 1980), and their utility for high capacity communications systems has been disclosed (co-assigned U.S. Pat. No. 4,406,516, and A. Hasegawa et al, *Proceedings of the IEEE*, Volume 69(9), pages 1145-1150 (1981), both incorporated herein by reference).

Furthermore, it has been found that solitons can be amplified nonelectronically without loss of soliton character (A. Hasegawa, *Applied Optics*, Volume 23(19), pages 3302-3309 (1984), and co-assigned U.S. Pat. No. 4,558,921, both incorporated herein by reference). Nonelectronic amplification, e.g., by means of the Raman effect, increases the pulse height and decreases the pulse width of fundamental soliton pulses. This coupling between pulse height and pulse width is an attribute of solitons, and its existence has been experimentally verified in single mode fiber with loss compensated by Raman gain (L. F. Mollenauer et al, *Optics Letters*, Volume 10, pages 229-231, 1985).

Although prior art soliton communication systems potentially have exceedingly high bandwidth, there is some uncertainty amongst workers is the field concerning the actually realizable bandwidth, due to interaction between soliton pulses. For instance, in a very recent paper (P. L. Chu et al, *Electronics Letters*, Volume 21(24), pages 1133-1134, November 1985), it is stated that, before soliton communications systems can become practical, the problem of the mutual interaction among solitons has to be solved. It is also stated there that such interaction can result is bandwidth reduction by a factor of 10, due to the variation of soliton separation as the solitons propagate down the fiber. As a solution to the alleged interaction problem, that paper teaches the use of solitons of unequal amplitude.

The potential bandwidth of a prior art soliton fiber communication system is so high that the actual rate of information transmission of such systems very likely will be limited by the bandwidth of available sources and detectors. Furthermore, the use of very high speed sources and detectors can be expected to add to the cost of such systems, and possibly adversely impact reliability. For these and other reasons, a soliton communication system that has as much or more bandwidth than prior art soliton systems but can fully utilize the available bandwidth without requiring unusually high speed sources, detectors and other electronics to achieve this end, would clearly be of great interest. This application discloses such a system.

GLOSSARY AND DEFINITIONS

Associated with any pulse of electromagnetic radiation is a center wavelength $\lambda_i$, a peak amplitude (or peak power), and a pulse width $\tau$. The center wavelength is the wavelength of maximum amplitude of the power spectrum of the pulse, the peak amplitude (or power) is the maximum amplitude (or power) of the pulse in the time domain, and $\tau$ is the full width at half maximum (FWHM) of the pulse in the time domain.

By the "wavelength" of a pulse we mean herein the center wavelength of the pulse.

By a "soliton" we mean herein a fundamental optical soliton, i.e., an optical pulse of $sech^2$ shape in intensity whose pulse width $\tau$ and peak power $P_o$ are related as disclosed in, inter alia, U.S. Pat. No. 4,406,516.

SUMMARY OF THE INVENTION

The propagation velocity of optical solitons is single mode optical fiber is a function of the wavelength of the soliton. Therefore, if two or more streams of solitons of different center wavelength are present in an optical fiber, the pulses of one stream will "collide" with those of another stream. Solitons are nonlinear pulses, and thus it appears likely, apriori, that such collisions affect the pulses, possibly even destroying their soliton character. For instance, it is known that sufficiently closely spaced optial solitons of the same wavelength are subject to an interaction which can result in a loss of the information carried by the solitons.

We have discovered that, although collisions between solitons of different wavelengths do have some effect on the solitons involved in tne collision, it is possible to operate a soliton communications system as a wavelength division multiplexed soliton system. In particular, we have discovered that the only significant interaction produced by the collisions is a random modulation of the propagation velocities. We have also discovered that the resulting distribution of pulse arrival time can be made to have a small and predictable variance. Thus, the expected error rate in a wavelength division multiplexed soliton system according to the invention can be kept arbitrarily small.

A communication system according to the invention comprises means for generating N streams of pulses of electromagnetic radiation, the pulses of the i'th stream having center wavelength $\lambda_i$, $i = 1 \ldots N$, $N \geq 2$. The inventive system further comprises a length of single mode optical fiber having a spectral region of anomalous group velocity dispersion, with all wavelengths $\lambda_i$ being in the anomalous group velocity dispersion region of the fiber, means for modulating the N pulse streams, means for multiplexing the N modulated pulse streams into a single multiplexed pulse stream, means for coupling the multiplexed pulse stream into the optical fiber at an input location such that the pulses of the coupled-in pulse stream form solitons in the fiber. The soliton pulses are guided in the fiber to an output location, spaced apart from the input locations (typically hundreds or thousands of km distant), with means for coupling the multiplexed pulse stream from the fiber at the output location, means for demultiplexing the coupled-out pulse stream such as to reform N modulated pulse streams, and means for detecting the coupled-out pulses. The system according to the invention typically also comprises such known components as attenuators for adjusting the peak amplitude of the pulses, amplifying means, and means for processing the output of the detector.

In exemplary embodiments, the optical fiber is silica-based single mode optical fiber having a spectral region of low loss (e.g., <0.2 dB/km), and having low but non-zero (anomalous) group velocity dispersion (e.g., $0 < D_t < 5$ ps/nm km, preferably <2 ps/nm·km) over at least a part (e.g., <nm, preferably >10 nm) of the low loss region. A system according to the invention comprises means (e.g., mode locked Raman soliton lasers as disclosed in co-assigned U.S. patent application Ser. No. 518,683, filed July 29, 1983 by L. F. Mollenauer) for producing at least two streams of radiation pulses that differ in center wavelength by $\delta\lambda$, where typically $\delta\lambda \geq 0.5$ nm.

Typically a system according to the invention also comprises means for producing and injecting pump radiation (of wavelength $\lambda_p < \lambda_1$, (where $\lambda_1$ is the shortest $\lambda_i$) into the fiber at intermediate points. The injection points are spaced distance L apart, where exemplarily $10 < L < 100$ km. In preferred embodiments, the parameters are chosen such that the soliton period $z_o$ (to be defined below) is greater than about L/4. Furthermore, in particularly preferred embodiments, the pump radiation comprises a multiplicity of wavelengths, the radiation being generated at each injection point by a multiplicity of radiation sources.

DETAILED DESCRIPTION

As is well known, the refractive index of materials is a function of wavelength. Thus, the phase and group velocities of electromagnetic radiation in a dielectric such as silica are a function of wavelength, and pulses of different wavelengths will have different propagation speeds in optical fiber. Consequently, if two or more pulse streams (having different $\lambda_i$) are propagating simultaneously in the same direction in a fiber, pulses of one pulse stream will move through those of another pulse stream. If the pulses are linear pulses, then such "collisions" between pulses by definition do not have any effect on the colliding pulses. On the other hand, a collision between nonlinear pulses (i.e., pulses whose characteristics depend on the presence of nonlinearity in the refractive index of the transmission medium) is in general expected to result in an interaction between the pulses. Solitons are nonlinear pulses, and it can therefore be expected that a collision between solitons will have an effect on the colliding pulses.

Even though co-propagating soliton pulses of different wavelengths do interact when the overtaking pulse moves through the overtaken pulse, the interaction leaves, for all practical purposes, the individual solitons intact. For instance, in a fiber transmission channel without loss the only significant consequence of a collision is that the overtaking soliton is moved slightly ahead of its normal position, and the overtaken one is slightly retarded. We have found that even hundreds of collisions will produce a net displacement of at most a few pulse widths $\tau$, with the variance of the displacement being a small fraction of $\tau^2$.

Furthermore, we have made the surprising discovery that the soliton-preserving quality of the collisions between co-propagating solitons of different wavelengths continues to hold in the presence of perturbations such as are present in real communications systems, e.g., distributed fiber loss, variations in fiber core diameter, lumped loss, and distributed gain. Thus, we have discovered that a wavelength division multiplexed soliton communication system is feasible, and we are disclosing herein techniques and formulae that permit the design of such a system.

Figure 1:
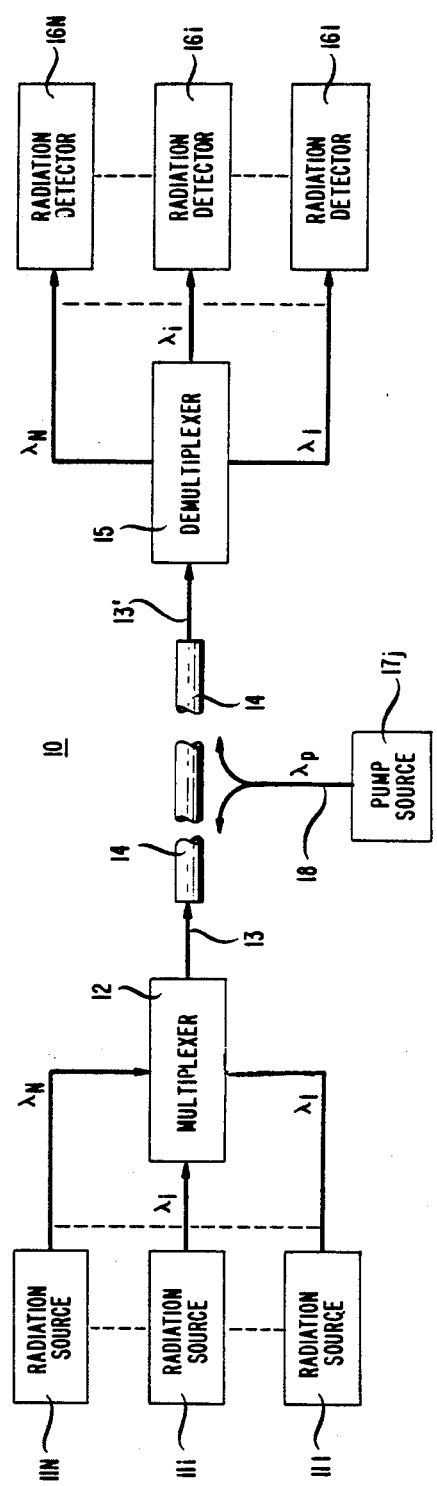
FIG. 1 schematically shows an exemplary communications system according to the invention.

FIG. 1 schematically depicts an exemplary communication system 10 according to the invention. Radiation sources 111 ... 111N each emit a stream of electromagnetic radiation pulses of center wavelength $\lambda_i$, $i = 1 \ldots N$, $N \geq 2$, (e.g., $2 \leq N \leq 20$), respectively. The pulses interact with a multiplexer 12, e.g., an optical grating, which serves to combine the N pulse streams into a single pulse stream 13 which is coupled into single mode (at all the wavelengths $\lambda_i$) optical fiber 14. The pulses in the multiplexed pulse stream are of a type that can form fundamental optical solitons in the optical fiber.

As is well known to those skilled in the art, it is only necessary for a coupled-in pulse of wavelength $\lambda_i$ to have approximately a sech amplitude envelope, and to have a pulse width and a peak power that are approximately related as per equation 3) of U.S. Pat. No. 4,406,516, in order to form a fundamental soliton in an appropriate low loss, low dispersion single mode fiber (provided $\lambda_i$ is in the anomalous dispersion region of the fiber).

The coupled-in pulses are guided through the fiber to an output location, where a single pulse stream 13', is coupled from the fiber into demultiplexer 15, exemplarily also an optical grating. The demultiplexer serves to divide pulse stream 13', into the various component streams of center wavelength $\lambda_i$, which are then detected by radiation detectors 161 ... 16N.

At one or more intermediate points along the fiber pump radiation of wavelength $\lambda_p$ may be injected into the fiber, so as to amplify the soliton pulses by means of stimulated Raman emission, and FIG. 1 shows an exemplary pump source 17, with pump radiation 18 bidirectionally coupled into fiber 14. Such well-known components as means for modulating the radiation sources to impress information on the pulse streams, attenuators, coupling means, and signal processing means are not shown in FIG. 1. It will be understood that actual communications systems typically permit bidirectional signal transmission, either alternately over the same fiber, or utilizing two (or more) separate fibers.

As is well known, only pulses whose wavelength is in the anomalous group velocity dispersion region of single mode optical fiber can become solitons. Thus all the center wavelengths $\lambda_i$ of the inventive communication system have to be in the anomalous group velocity dispersion region of fiber 14. Furthermore, the center wavelengths of a system according to the invention are advantageously chosen to lie in a low loss wavelength region of the optical fiber. For instance, in a system using silica-based fiber, the center wavelengths advantageously are chosen to be in the low loss region at or near about 1.55 $\mu$m.

Although the invention can be practiced with any optical fiber in which solitons can be formed and propagated, the discussion herein will be, for the sake of concreteness, in terms of silica-based fiber. Although the material dispersion of vitreous silica is zero at about 1.3 μm, silica-based optical fiber can be designed such that its group velocity dispersion $D_t$ has a zero in the 1.55 μm low loss window. The group velocity dispersion is anomalous at wavelengths longer than the zero dispersion wavelength. Furthermore, such fiber can be designed such that $D_t$ is small over a relatively wide spectral region. See, for instance, U.S. Pat. No. 4,435,040. As an example, silica-based optical fiber having $0 < D_t \leq 2$ ps/nm km and loss less than 0.2 dB/km over an approximately 20 nm wide wavelength region is possible. See, for instance, L. G. Cohen et al, *Electronics Letters*, Volume 18, pages 1023-1024, 1982.

Soliton fiber communications systems can be advantageously used as high bit rate long haul systems, e.g., an an intercontinental transmission system. In such systems, signal amplification at intermediate points along each channel is required for any currently known fiber. Such amplification is advantageously done nonelectronically, as disclosed in co-assigned U.S. Pat. No. 4,558,921. A particularly advantageous amplification technique relies on stimulated Raman emission. A particularly advantageous Raman amplification scheme uses multiple pump sources. See co-assigned U.S. Patent application Ser. No. 791,915, filed Oct. 28, 1985 by L. F. Mollenauer et al, incorporated herein by reference.

Figure 2:
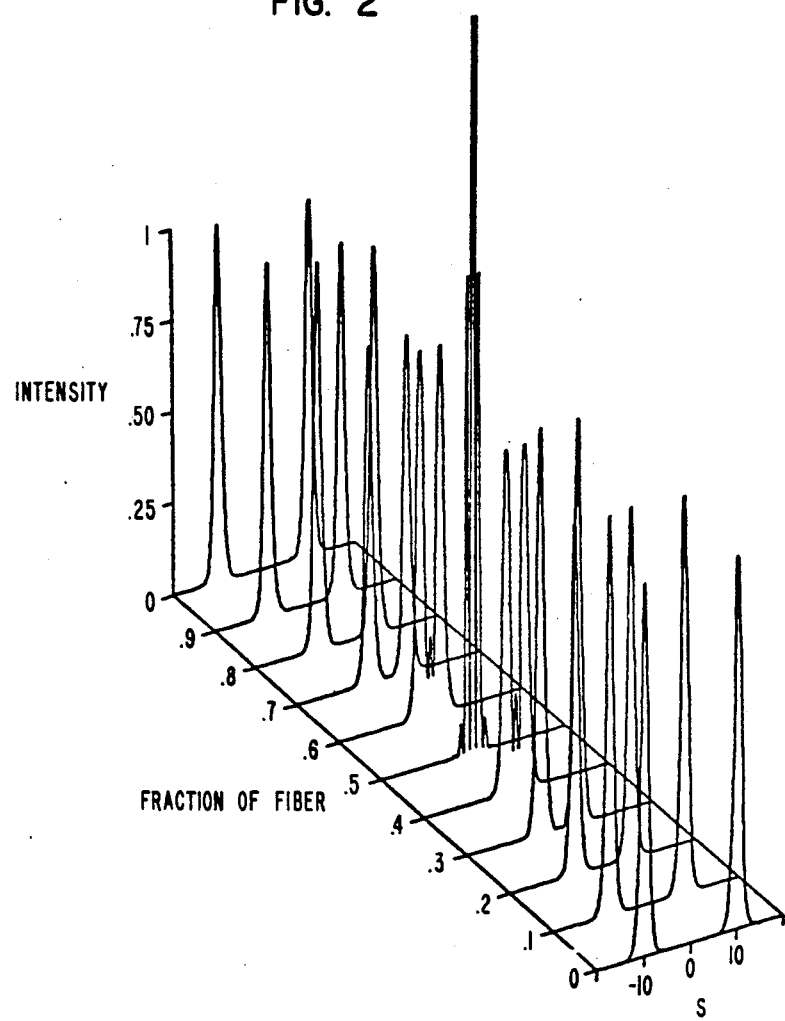
FIG. 2 shows two colliding soliton pulses.

FIG. 2 shows an exemplary result of a numerical study of co-propagating solitons of different wavelengths, namely, a collision in gain perturbed fiber between two soliton pulses that differ in wavelength by $\delta\lambda$ (and therefore have a velocity difference $2\Omega$, where $\Omega = 1.76 \ z_o D_t \delta\lambda / \pi\tau$). The soliton period $z_o = 0.322 \pi^2 c \tau^2 / \lambda_i^2 D_t$, where c is the speed of light in vacuum, and $\lambda_i$ is the center wavelength of any one of the solitons). In the calculation we have assumed the following parameter values: $\lambda_i$ 1.55 μm, $D_t = 2$ ps/nm·km, $z_o = 27$ km, $\delta\lambda = 0.8$ nm. The parameter s of FIG. 2 is the relative position of the center of solitons in dimensionless time. The development of the pulses was followed over a distance equal to $4L = 160$ km.

As FIG. 2 shows, one pulse moves through the other, with no difference in pulse height, width, or shape (other than those which are due to the gain perturbation in the fiber) detectable between well separated pre- and post-collision pulses. The same conclusion can be drawn from our other studies in which we used different parameter values.

Figure 3:
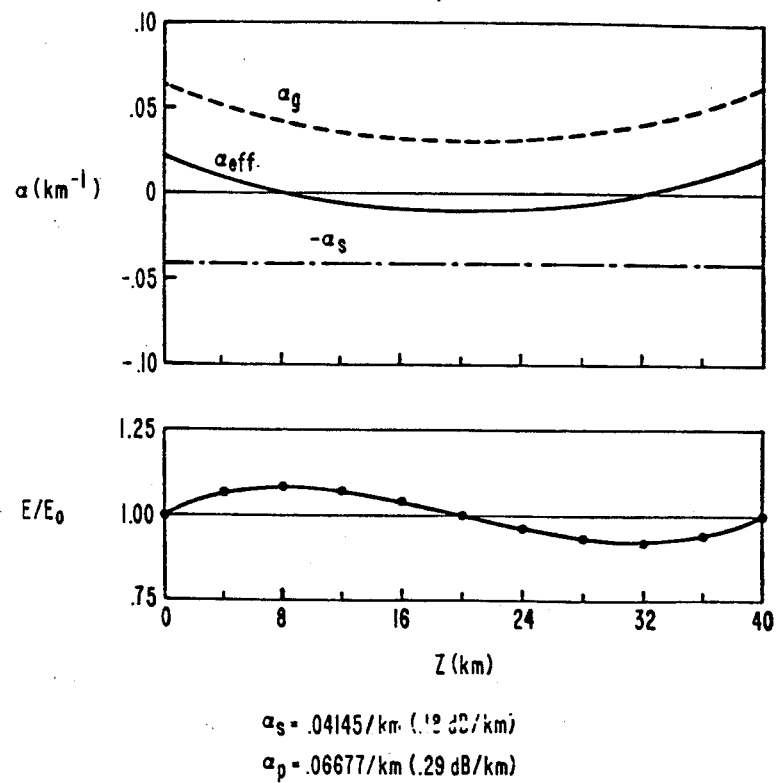
FIG. 3 depicts attenuation constants and pulse height as a function of longitudinal fiber coordinate for one amplification section of an exemplary system according to the invention.

FIG. 3a shows exemplary loss coefficient $\alpha_s$, gain coefficient $\alpha_g$ and resultant effective gain coefficient $\alpha_{eff}$, as a function of z, the longitudinal fiber coordinate, and FIG. 3b shows the corresponding normalized soliton pulse energy, respectively, as a function of z, for one section of a soliton system with Raman amplification. In FIG. 3, it is assumed that $\alpha_s = 0.18$ dB/km, $\alpha_p = 0.29$ dB/km, and $L = 40$ km, where $\alpha_p$ is the loss coefficient of the pump radiation. Pump radiation injection is assumed to occur bidirectionally at $z = 0$ and $z = L$, with pump power adjusted to result in zero overall gain or loss for the section.

The amplitude envelope shape u of a fundamental soliton having differential velocity $\Omega$ can be written as:

$$u = A\,\mathrm{sech}[A(s - \Omega\zeta)]\exp[i(\Omega s + \phi)],$$

where $\phi = (A^2 - \Omega^2)\zeta/2$, $\zeta = z\pi/2z_o$. Furthermore, the differential velocities of well separated soliton pulses can always be computed as $$\Omega = Im \int_{-\infty}^{\infty} u^* u_s \, ds \Big/ \int_{-\infty}^{\infty} u^* u \, ds,$$

where the star implies complex conjugation, Im means "imaginary part", and the subscript implies the derivative with respect to s.

Figure 4:
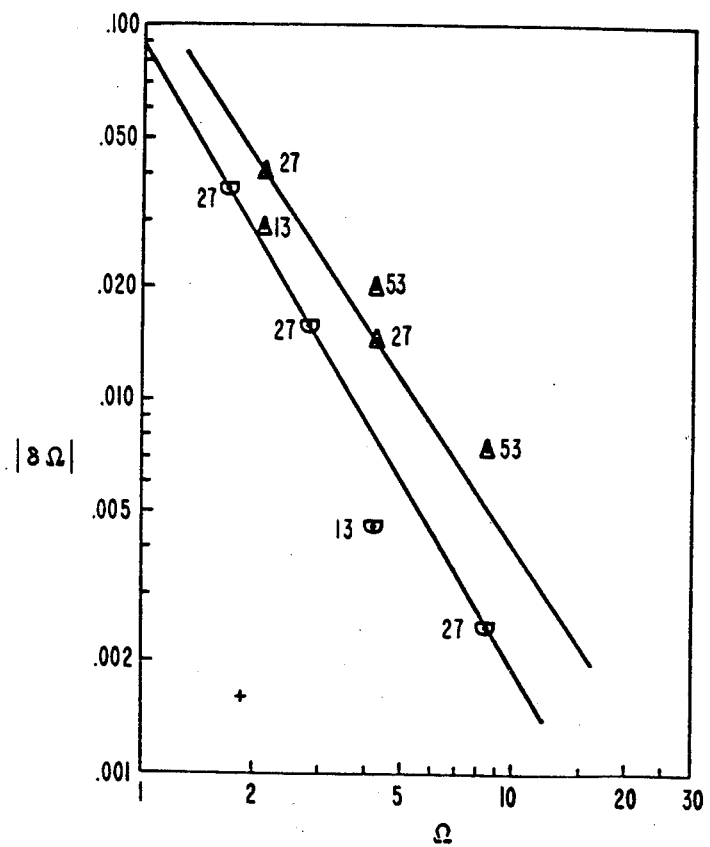
FIG. 4 gives data on the change of velocity experienced by colliding solitons.

Using the above expressions, for each of the collisions studied we computed the post-collision velocities of the pulses and compared them with the initial velocities. Exemplary velocity changes $\delta\Omega$ are shown, as a function of $\Omega$, in FIG. 4, wherein the numbers next to the data points give the value of $z_o$ (in km). In FIG. 4, it is assumed that the spacing L between pump radiation injection points is 40 km, and that pump power is adjusted such that the overall gain of each claimed segment of length L is zero. Furthermore, the initial conditions were arranged such that collisions took place at points where $\alpha_{eff}$ is maximum or minimum, respectively, as well as where $\alpha_{eff}$ is nearly zero. The effective local loss coefficient $\alpha_{eff} = (-\alpha_s + \alpha_g)$, where $\alpha_s$ is the fiber loss coefficient, and $\alpha_g$ is the (Raman) gain coefficient which is a function of z. Triangular data points in FIG. 4 refer to collisions at points of maximum gain, where $\delta\Omega$ is negative half circles to collisions at points of minimum gain, where $\delta\Omega$ is positive and the cross to collisions near the point of zero gain.

The data of FIG. 4 fit the following empirical expression:

$$\delta\Omega = -1.72\alpha_{eff} z_o^{\frac{1}{2}} / \Omega^{1.7} \qquad (1)$$

It will be understood that equation (1) is approximate only.

An important characteristic of any communications system is the maximum allowable error rate r. If the acceptance window for a pulse at the detector is 2W in dimensionless time units, then $$r = (2/\sqrt{2\pi}) \int_a^\infty \exp(-y^2/2) dy$$

where $a^2 = W^2 / <\delta s^2 <$, with $<\delta s^2>$ being the variance in arrival time. If, for instance, $r = 10^{-9}$, then $<\delta s^2> = W^2/(6.1)^2$. An advantageous exemplary value of $2W = 0.7$ T, where T is the spacing between adjacent pulses of given $\lambda_i$. This choice of acceptance window allows for finite pulse width and detector response time. For this choice of W $$<\delta s^2> = 0.01(T/\tau)^2.$$

Furthermore, it is typically desirable that $\tau < T/5$, e.g., $\tau = T/10$. Thus $<\delta s^2>$ exemplarily is of order 1.

In a soliton system according to the invention, collisions between pulses are not the only reason that $><\delta s^2> \neq 0$. Another reason is random modulation of the pulse frequencies due to spontaneous Raman emission. The total allowed variance must be shared between the collisional and Raman noise effects. For instance, for $r = 10^{-9}$, $2W = 0.7T$, and $\tau = T/10$, $$<\delta s^2>_{coll} + <\delta s^2>_{Raman} \approx 1.$$

The distribution between the two variances can be chosen to suit systems requirements: for instance, increased collisional variance will allow an increased number of multiplexed wavelengths, at the sacrifice of total system length (since total system length $Z \propto \langle\delta s^2\rangle_{Raman}^{-1}$). For instance, for silica fiber having $D_t = 2$ psec/nm km, $\alpha_s = 0.18$ dB/km, and fiber core cross section area 25 $(\mu m)^2$, the maximum system length consistent with $r \leq 10^{-9}$ is $$Z = 62.3(T/\tau)^3 \tau$$

with Z is km, and T and $\tau$ in picoseconds.

We have found that $$\langle\delta s^2\rangle_{coll} = f^2(\delta\Omega)_c^2 \zeta_z^3 / 4.8\Delta\zeta,$$

where $\zeta_z$ is the dimensionless overall system length, $(\delta\Omega)_c$ pertains to a collision at the point where $\alpha_{eff}$ is minimum, f is a constant that converts $(\delta\Omega)_c$ to the rms value for an amplification period, and $\Delta\zeta$ is the effective mean distance between collisions.

By numerical integration we have determined that, for $\alpha_s = 0.18$ dB, $\alpha_p = 0.29$ dB, L = 30, 40, and 50 km, $f^2 = 0.83, 0.86$, and 0.90, respectively. Thus, f is approximately 1 in many cases of practical interest.

The following equation is important in the design of communications systems systems according to the invention:

$$(\delta\Omega)_c \sqrt{n_\Omega} = 4.95(z_0/Z)^{3/2} \langle ds^2\rangle^{\frac{1}{2}}/(f\sqrt{n_n}) \quad (2)$$

with $$n_n = \sum_{i=2}^{N} (Int\, \frac{i}{2})^{-2.4},$$

where "Int x" means "the largest integer $\leq x$". For $N = 2, 3, 4 \ldots, n_n = 1, 2, 2.19 \ldots$, and converges to $\sim 2.7$ for large N.

With Z and $z_0$, as well as r (and therefore $\langle\delta s^2\rangle$) given, equations (1) and (2) permit determination of the minimum allowed $\Omega$, which, from these calculations and for other reasons, is found typically to be greater than 5, preferably at least about 10. Given this minimum $\Omega$, the minimum wavelength spacing $\delta\lambda$ between channels can be determined from $$\delta\lambda = \lambda_i \Omega/(cD_t z_0)^{\frac{1}{2}}. \quad (3)$$

in which $\lambda_i$ is the center wavelength of any one of the channels. The minimum practical channel spacing typically is greater than about 0.5 nm, and the channel spacing in a system according to the invention typically is between about 0.5 and about 10 nm. The maximum allowed number of channels then is $N = Int[(\Delta\lambda/\delta\lambda) + ]$ where $\Delta\lambda$ is the total wavelength range allocated for multiplexing. Since N enters also into the determination of $n_n$, it will be appreciated that iteration may be required to find a self-consistent solution of equations 1–3. However, a very small number of iterations typically suffices to produce an acceptable solution.

Using the above equations, we have determined the parameters of exemplary systems according to the invention. The results are summarized in Table I, for $D_t = 2$ ps/nm·km, $\Delta\delta = 20$ nm, L = 30 km, $r = 10^{-9}$, and $\langle\delta s^2\rangle_{coll} = \langle\delta s^2\rangle_{Raman}$ (Designs A, B, C) and $\langle\delta s^2\rangle_{coll} = 9\langle\delta s^2\rangle_{Raman}$ (Designs B', C'). The pulse widths of the solitons in the design examples are in the range of 7–23 psec, and the balanced peak powers range from about 27 to about 3 mw.

TABLE I

| Design | $z_0$(km) | Z(km) | $\Omega$ | N | NR(GHz) | NRZ(GHz.km) |
|---|---|---|---|---|---|---|
| A | 11 | 1750 | 17 | 3 | 39 | 68,000 |
| B | 30 | 2860 | 13.7 | 5 | 40.5 | 116,000 |
| C | 100 | 5200 | 10.8 | 10 | 44 | 229,000 |
| B' | 30 | 1650 | 5.4 | 11 | 89 | 147,000 |
| C' | 100 | 3000 | 4.2 | 24 | 106 | 317,000 |

In Table I, N is the number of multiplexed channels, and NR is the maximum allowable bit rate. As can be seen, for a particular assignment of the variance in s, the maximum bit rate does not vary much with $z_0$ and Z. Because of soliton stability considerations, we believe that advantageously $z_0 < L/16$ or $z_0 > L/4$, with the latter being greatly preferred. This recommendation is based on our discovery that for $z_0 [L/8$ solitons typically experience pronounced instability.

When designing a system according to the invention, such that $z_0 >> L/8$ (e.g., design examples B, C, B' and C') one can achieve very high total bit rates (of order 100 GHz), system lengths of several thousand km, high stability, and a relatively large number of channels, resulting in relatively low bit rates/channel. Furthermore, in inventive systems, multiplexing and demultiplexing is carried out only at each end of the system, and not also at intermediate points, as is the case in prior art systems with repeaters.

These characteristics make possible the design of very high capacity communications systems of greatly reduced overall complexity and expense, as compared with prior art multiplexed systems. In particular, systems according to the invention do not require the use of unusually fast electronics, and do require only two signal lasers per channel (one at each end), which are located in an easily controlled environment (the transmitter station), and thus can be of superior stability and resolutions.

What is claimed is:

1. An optical fiber soliton communications system comprising
   (a) means for generating a sequence of pulses of electromagnetic radiation of a given wavelength;
   (b) a single mode optical fiber having anomalous dispersion in a spectral region that includes the given wavelength;
   (c) means for coupling the sequence of pulses into the fiber at an input location, the coupled-in pulses being of a type that can form fundamental solitons in the fiber, the coupled-in pulses propagating in the fiber from the input location to an output location spaced apart from the input location; and
   (d) means for detecting the sequence of pulses at the output location;
   characterized in that the communications system is a multiplexed soliton communications system that comprises N channels, where N is an integer $\geq 2$, any given channel of the multiplexed soiton communications system (to be referred to as the i'th channel i = 1, 2, ... N) comprising
   (e) means for generating a sequence of pulses of electromagnetic radiation of wavelength $\lambda_i$, with $\lambda_i < \lambda_{i+i}$, any given $\lambda_i$ being within the spectral region in which the fiber has anamalous dispersion; and (f) means for detecting the sequence of pulses of wavelength $\lambda_i$ at the output location; and the communications system further comprises (g) means for multiplexing the N sequences of pulses, thereby forming a multiplexed sequence of pulses;

(h) means for coupling the multiplexed sequence of pulses into the fiber at the input location, all the coupled-in pulses of the multiplexed sequence of pulses being of a type that can form fundamental solitons in the fiber; and (i) means for demultiplexing the multiplexed sequence of pulses at the output location, thereby reforming the N modulated sequence of pulses of wavelengths $\lambda_1, \ldots \lambda_N$.

2. Communications system of claim 1, further comprising at least one source of cw pump radiation of wavelength $\lambda_p < \lambda_1$, and means for coupling the pump radiation into the fiber at a pump location intermediate the input location and the output location.

3. Communications system of claim 1, wherein $\lambda_{i+1} - \lambda_i \geq 0.5$ nm for any i, and wherein for any channel $0 < D_f(\lambda) < 5$ ps/nm km, where $D_f(\lambda)$ is the fiber dispersion at the wavelength associated with the channel.

4. Communications system of claim 3, further comprising means for generating cw pump radiation of wavelength $\lambda_p < \lambda_1$, and means for coupling pump radiation into the fiber at a multiplicity of spaced apart pump locations intermediate the input and output locations, with the spacing L between any two adjacent pump locations being such that $z_o > L/4$, where the soliton period $z_o = 0.322\ \pi^2 c\tau^2/\lambda_1^2 D_f$, with c being the speed of light in vacuum, $\tau$ the width of the solitons of wavelength $\lambda_1$, and $D_f$ the dispersion of the fiber at the wavelength $\lambda_1$.

* * * * *